March 10, 1970    MITSUO NAKAMURA    3,500,443
COMBINED STEERING COLUMN LOCK AND IGNITION
SWITCH FOR A MOTOR VEHICLE
Filed Feb. 12, 1968    2 Sheets-Sheet 2

INVENTOR.
MITSUO NAKAMURA

BY

McGlew & Toren
ATTORNEYS

United States Patent Office 3,500,443
Patented Mar. 10, 1970

3,500,443
COMBINED STEERING COLUMN LOCK AND IGNITION SWITCH FOR A MOTOR VEHICLE
Mitsuo Nakamura, 659–3, Daitakubo, Urawa-shi, Saitama-ken, Japan
Filed Feb. 12, 1968, Ser. No. 704,752
Claims priority, application Japan, Apr. 4, 1967, 42/21,367
Int. Cl. H01h 9/28
U.S. Cl. 200—61.54
8 Claims

ABSTRACT OF THE DISCLOSURE

A device for use in a motor vehicle is formed of a lock housing mounted on the steering column which contains a key cylinder interconnected with members for operating the ignition system and for locking the steering column. A driver mechanism is coupled to the key cylinder, and when the key cylinder is rotated, the driver mechanism rotates and operates the ignition switch and also selectively positions a bolt assembly for locking the steering column. The bolt assembly includes a bolt engageable within a keeper slot in the steering column, means for biasing the bolt into the slot, and latch means which prevent the bolt from reentering the slot after it has been withdrawn until the key is removed from the key cylinder.

SUMMARY OF THE INVENTION

The present invention is directed to a locking device for the steering column of a motor vehicle and, more particularly, to a device which combines the feature of a lock for the steering column and means for operating the ignition switch in a motor vehicle.

In the present invention, a key operated cylinder is located within a lock housing. When the cylinder is turned to the locked position and the key is withdrawn, a bolt is dropped into a keeper slot in the steering column to prevent movement of the column. In the locked position the ignition switch is also in the off position and the motor vehicle cannot be moved. When the key is inserted into the cylinder and rotated, the bolt is withdrawn from the keeper slot releasing the steering column and the ignition switch can be moved to the on position for starting up and operating the vehicle.

In burglar-proof locking devices for steering columns used at the present time, several different means are employed for locking the column, for instance a locking device separate from the ignition switch operating assembly is employed, or the steering mechanism and a lever are connected by locking parts or a device is employed wherein a lever locks the steering column against movement. In these different arrangements, the ignition switch key cylinder is operated separately from the locking device for the steering column and, as a result, their use is inconvenient.

Accordingly, a primary object of the invention is to incorporate the steering column locking device and the ignition switch within a single member.

Another object of the invention is to afford an arrangement wherein the locking device for the steering column is biased into the locking position and requires the insertion of the ignition key into the key cylinder and rotation of the cylinder before the steering column is unlocked.

A further object of the invention is to provide an arrangement wherein the key must be removed from the key cylinder after operation of the vehicle before the steering column locking device is in its operative condition.

Still another object of the invention is to supply a safe, effective and efficient device for the combined operation of the ignition switch and steering column locking device within a motor vehicle.

In the present invention, a lock housing is secured to the column jacket of a steering column and in the locked position a bolt is extended from the housing into a keeper slot in the steering column, making it impossible to rotate the column. Additionally, a key cylinder is provided in the housing for operating the ignition switch of the vehicle as well as for positioning the bolt in the housing. This device may be mounted on the dashboard of a vehicle for replacing the conventional ignition switch mechanism.

In this device, a driver member is secured to the inner end of the key cylinder, and when the key is inserted and rotated, the driver effects a cam motion which removes the bolt from its locking engagement with the steering column and moves the bolt to its unlocked position against the biasing action of a compression spring.

When it is desired to discontinue operation of the vehicle, the key cylinder is moved back to the locked position but as long as the key is kept inserted in the cylinder, the bolt is maintained in the unlocked position. However, when the key is withdrawn from the cylinder, it releases the driver member and the compression spring drives the bolt into the keeper slot in the steering column.

By employing this combined device, the car not only cannot be started but when the key is removed from the cylinder, the steering column is locked and it is not possible to steer the vehicle whereby burglary of the vehicle is easily prevented.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Detailed description

Figure 1:
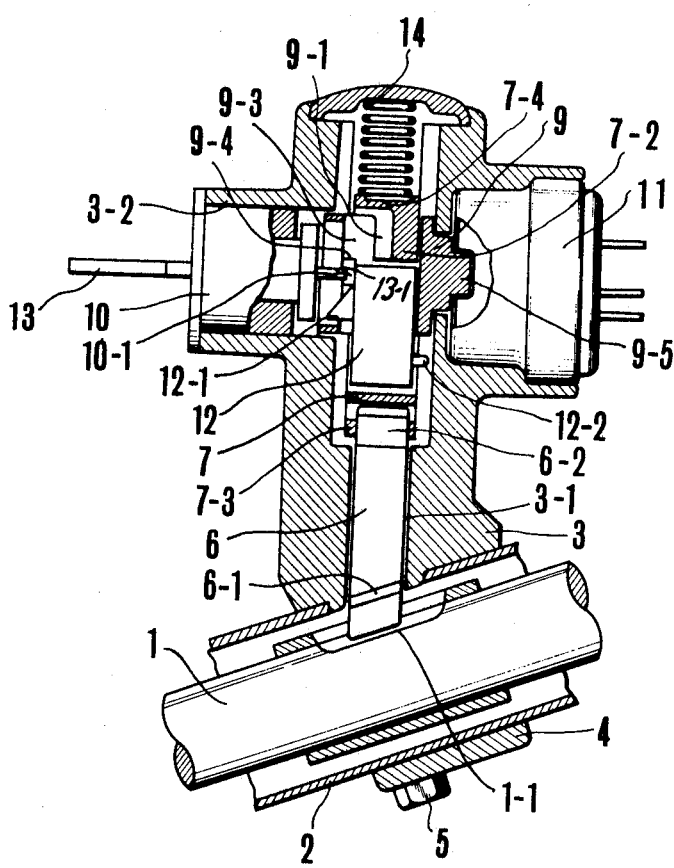
FIG. 1 is a vertical view, partly in section, of a combined device for operating an ignition switch and locking a steering column in a motor vehicle in accordance with the present invention.

In the drawings, a steering column 1 is disposed within a column jacket 2 and a lock housing 3 is secured to the column by means of a bracket 4 and a bolt 5. The lock housing is comprised of a pair of passageways 3–1 and 3–2 disposed at right angles to one another. Passageway 3–1 is disposed obliquely to the axis of the steering column, as shown in FIG. 1, and contains the locking assembly including a bolt 6 which, in the locked position, is fitted into a keeper slot 1–1 in the steering column. In the passageway 3–2, a rotatable key cylinder 10 is disposed for selectively positioning the locking assembly and for operating the ignition system of the vehicle.

The bolt 6 is formed of a rod which has either a circular or a rectangular cross section, the end 6–1 of the rod which fits within the keeper slot 1–1 in the steering column 1 has a reduced cross section. At its opposite end 6–2, the bolt has a T-shaped extension which fits within the end of a hanger 7 located in the passageway 3–1. The hanger 7 and the bolt 6 are interconnected for movement as a single unit in the axial direction of the passageway 3–1 between the locked and unlocked positions of the device.

Figure 2:
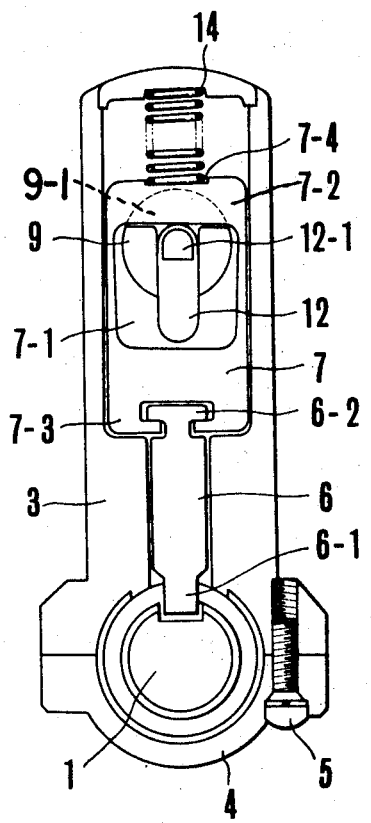
FIG. 2 is a vertical view, partly in section, taken at a right angle to the plane of FIG. 1, and showing the device arranged in the locked position.

The hanger 7, as shown in FIG. 2, has a rectangular shape with a rectangular opening 7–1 extending through it. A portion of the hanger adjacent the hollow portion forms a bladed section 7–2. At its lower end 7–3, as viewed in the drawings, the hanger is secured to the bolt and at its opposite end 7–4, it is in contact with a compression spring 14 which extends between the hanger and the inner surface of the lock housing 3 at the end of the passageway 3–1.

Positioned within the open section 7–1 of the hanger is a cylindrically shaped driver member 9 having a notched portion 9–1 on a part of its cylindrical periphery. It also contains a passage 9–2 having a square cross section which extends from the notched portion 9–1 through the center of the driver member. Within the passage 9–2 a face 9–3 on the driver member confronts the end of the key cylinder and is provided with a hole 9–4 within which a joint portion 10–1 of the key cylinder 10 is fitted for transmitting rotation of the key cylinder 10 to the driver member 9. Located on the opposite side of the driver member 9 from the key cylinder 10 is a coupling 9–5 which transmits the rotation of the key cylinder to a switch 11 for operating the ignition system of the motor vehicle.

The driver member 9 not only transmits the rotary motion of the key cylinder to the switch 11, but it also controls the motion of the hanger 7 within the passageway 3–1 by the interaction of the blade portion 7–2 of the hanger with the notched portion 9–1 of the driver member.

A plunger 12 is situated in the passage 9–2 within the driver member 9. The plunger is rectangular in cross section and is of a size which will slide wtihin the passage 9–2 and its length is approximately equal to the diameter of the cylindrical driver member.

As shown in FIG. 1, on one face of the plunger 12 there is a stopper or latch 12–1 and on the opposite face there is a pin 12–2 both of which extend outwardly in a direction disposed at right angles to the direction in which the plunger slides within the passage 9–2. The stopper 12–1 and the pin 12–2 may move into and out of the body of the plunger by means of springs 12–3 and 12–4 when force is exerted against these projections they move into the plunger and leave it with an unobstructed outer surface.

Figure 3:
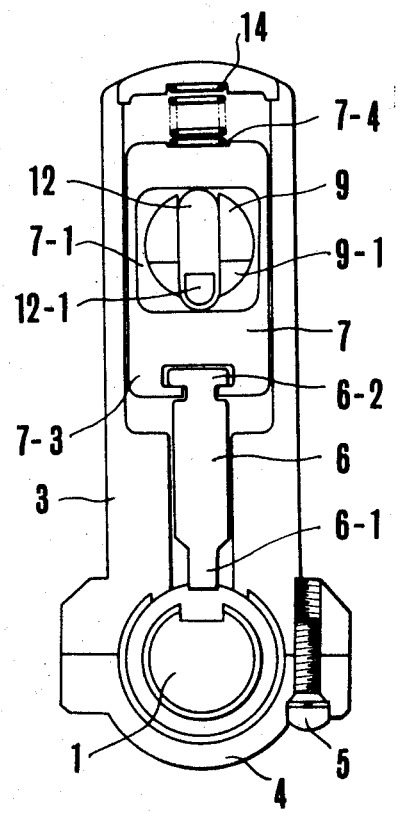
FIG. 3 is a view, similar to FIG. 2, however, with the device shown in the unlocked position.

Normally the plunger 12 does not project from the cylindrical peripheral face of the driver member 9 but when the blade portion 7–2 of the hanger faces the notched portion 9–1 of the driver, the plunger is forced to move in the axial direction of the passageway 3–1 by the blade portion and it projects from the passage 9–2 on the opposite side of the driver member, see FIGS. 2 and 3.

Figure 4:
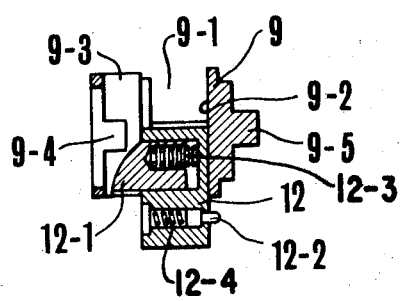
FIG. 4 is a sectional view of a portion of the device shown in FIG. 1.

The stopper 12–1 of the plunger has a sloping or slanted side face as shown in FIG. 4 and is directed toward the end face 9–3 of the driver and remains in this position while the plunger slides in the passage 9–2. When a key 13 is inserted fully into the key slot 13–2 of cylinder 10, its inner end 13–1 projects from the key cylinder and extends into the passage 9–2 within the end face of the driver and the end of the key strikes against the stopper 12–1.

The compression spring 14 at the opposite end of the passage 3–1 from the steering column forces the hanger 7, the plunger 12 and the bolt 6 in the direction of the steering column 1 and when this assembly is free to move, the spring forces the bolt into locking engagement within the keeper slot 1–1 in the steering column.

Figure 5:
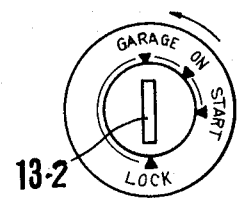
FIG. 5 is a front view of a portion of the device shown in FIG. 1.

The following is a description of the operation of the present invention:

When the operation of a motor vehicle is to be discontinued, the key 13 is turned within the key slot 13–2 from the "on" position to the "garage" position, as shown in FIG. 5. Next, the key is turned counterclockwise as far as possible into the "lock" position for locking the steering column. Since the key cylinder is interconnected to the driver 9 by means of the joint portion 10–1, the assembly of parts within the passage 3–1 of the lock housing 3 is ready to be moved to the "lock" position and the coupling 9–5 operates the switch for the ignition system.

As the driver 9 is rotated into the "lock" position, the notched portion 9–1 of the driver coincides with the blade portion 7–2 of the hanger and the plunger receives a downward thrust which would be sufficient to extend it outwardly from the cylindrical face of the driver except that stopper 12–1 on the plunger is prevented from moving toward the steering column by the tip 13–1 of the key which extends through the hole 9–4 into an obstructing position in the path of the stopper 12–1.

In this position, the plunger is ready to be pushed toward the steering column and when the key is withdrawn from the cylinder 10, it releases the stopper 12–1 and the plunger is then moved by the action of the blade portion 7–2 toward the steering column 1. With the release of the plunger, there is nothing to prevent the hanger 7 and the bolt 6 from moving toward the steering column and they proceed to do so under the action of the compression spring 14. The end 6–1 of the bolt extends into the keeper slot 1–1 and locks the steering column against movement. As indicated previously, when the plunger 12 is disposed within the passage of the driver member 9, the pin 12–2 is retained inwardly from the surface of the driver member. However, when the plunger is directed outwardly from the passage 9–2, in the locked position, as indicated in FIGS. 1 and 2, the pin extends outwardly from the surface of the driver and prevents the plunger from returning to its former position, thereby insuring the locked arrangement.

In the "lock" position, the compression spring 14 pushes against the hanger 7 which falls into the notched portion 9–1 of the driver and forces the plunger 12 outwardly from the passage 9–2 in the driver and the end portion 7–3 of the hanger connected to the bolt 6 assures the insertion of the bolt into the keeper slot in the steering column. When the steering column is in the "lock" position and it is desired to operate the car, the key 13 is inserted to a full extent into the key cylinder 10 and turned in a clockwise direction toward the "garage" position as shown in FIG. 5. As the key is rotated, the cylinder rotates within the passageway 3–2 and by means of its end section 10–1, rotates the driver causing the blade portion 7–2 of the hanger to ride outwardly on the cylindrical face of the driver from the notched portion 9–1. Due to this movement, the hanger is moved outwardly through the passage 3–1 away from the steering column causing the compression spring 14 to be depressed and also withdrawing the end 6–1 of the bolt 6 from the keeper slot 1–1 in the steering column 1.

The rotation of the driver 9 will cause the plunger to move with it and the plunger will contact the inner surface of the opening 7–1 within the hanger and the plunger 12 will slide back into the passage 9–2 of the driver member. As the driver is turned within the hanger, the pin 12–2 which has been projecting from the plunger in the locked position will recede into the plunger as it comes in contact with the face of the driver within the lock housing to permit the sliding motion of the plunger back into the driver. As the plunger slides into the driver, the slant face of the stopper 12–1 is pushed by the end 13–1 of the key into the plunger and after the stopper moves past the end of the key, it will again project from the plunger. Thus, in the unlocked position, the hanger 7 is supported on the circumferential face of the driver 9 and the bolt 6 is withdrawn from the keeper slot in the steering column, further, the plunger 12 is returned to its position within the passage 9–2 in the driver member and this movement causes the hanger to maintain the spring 14 in a compressed condition while the vehicle is operated.

The key 13 may be turned from the "garage" to the "on" and "start" positions of the ignition switch, but the locking device, for purposes of safety, will only operate when the key cylinder is in the "lock" position and the key is withdrawn from its cylinder. When the key cylinder is moved to the "lock" position but the key is retained within the cylinder, though the blade portion 7–2 of the hanger coincides with the notch portion 9–1 of the driver, the stopper 12–1 is retained in its upper position because of the blocking action of the key end 13–1, and the bolt 6 cannot enter the keeper slot 1–1 until the key is withdrawn.

As mentioned above, in the present invention a locking device is combined with a conventional ignition switch mechanism which operates to effectively lock the steering column only when the key is turned to the "lock" position of the key cylinder and is withdrawn from the cylinder. Accordingly, when the steering column is locked, it can be released only when the correct key is inserted into the cylinder and turned to the proper position. Thus, a simple and completely reliable burglar-proof device for a motor vehicle is provided.

While a specific embodiment of the invention has been shown and described in detail to illustrate the application of the inventive principles, it will be understood that the invention may be embodied otherwise without departing from such principles.

What is claimed is:

1. A device for a motor vehicle for operating the ignition system and for locking the steering column comprising a lock housing arranged to be mounted on the steering column of a motor vehicle, said lock housing forming a first passageway and a second passageway disposed transversely to and intersecting the first passageway, the axis of the second passageway being arranged to intersect the steering column, a bolt disposed within and movably positionable in the axial direction of the second passageway of said housing and into and out of locking engagement with said steering column, a key cylinder rotatably mounted within the first passageway in said housing, a hanger located within and movably positionable in the axial direction of the second passageway in said housing and having an opening therethrough arranged to register with the first passageway, said bolt being detachably secured to said hanger so that a certain amount of play is permitted between said bolt and said hanger, means within the second passageway for biasing said hanger and bolt in the direction of the steering column for urging said bolt into locking engagement with the steering column, a rotatable driver member having its axis of rotation extending in the axial direction of the first passageway and extending through the opening in said hanger, said driver member being interengaged with said key cylinder for transmitting the rotation of said key cylinder to said driver member, a projection extending from said driver member at a position remote from said key cylinder for operating the ignition system, said driver member having a peripheral surface located within the opening in said hanger and said peripheral surface being rotatable about the axis of rotation of said driver member, said driver member having a passageway therethrough within the portion thereof bounded by said peripheral surface, a notched section formed in the peripheral surface of said driver member, a plunger supported within the passageway in said driver member and being rotatable with the driver member, said plunger being movably positionable within the passageway, and latch means within said plunger for holding said plunger in position in the passageway until said latch means are released, so that by inserting a key into the said key cylinder and rotating said key cylinder, in turn, said driver member is rotated and alternately said peripheral surface and said notched section in said peripheral surface are in contact with said hanger for moving said hanger and said bolt detachably secured thereto through the second passageway for selectively locking and unlocking the steering column.

2. A device as set forth in claim 1, wherein said first passageway is arranged perpendicularly to said second passageway, and said second passageway is arranged to be obliquely disposed with respect to the steering column of the motor vehicle.

3. A device, as set forth in claim 1, wherein said hanger has a slot at one end to receive said bolt, said bolt having its end secured to said hanger shaped to fit within the slot in said hanger and to afford limited movement of said bolt within the slot in the axial direction of the second passageway.

4. A device as set forth in claim 3, wherein the slot in said hanger is T-shaped, and said bolt has a T-shaped projection on its end for insertion into said T-shaped slot in said hanger.

5. A device, as set forth in claim 1, wherein said means for biasing said hanger and bolt comprising a spring disposed within said second passageway and extending between said housing and the end of said hanger opposite the end to which said bolt is secured.

6. A device as set forth in claim 1, wherein the opening through said hanger is rectangular in shape and at least a portion thereof is aligned with said key cylinder in said first passageway.

7. A device, as set forth in claim 6, wherein said hanger has a blade section adjacent the rectangular opening therethrough, said blade section being located adjacent the end of said hanger opposite the end to which said bolt is connected, and said blade section arranged to be contacted alternately by the peripheral surface and the notched section of the peripheral surface of said driver member in displacing said bolt between the locked and unlocked positions.

8. A device, as set forth in claim 1, wherein said latch means within said plunger comprises a latch member extending outwardly from one face of said plunger toward said key cylinder and a pin projecting outwardly from the opposite face thereof, said latch member and said pin being depressible inwardly into said plunger, whereby in its extended position said pin secures said plunger in place when said bolt is in the lock position in the steering column and said latch member is arranged to be engaged by the end of a key inserted into the key cylinder when the driver member is rotated into the locked position whereby the latch member prevents said hanger and bolt from moving toward the steering column until the key is removed from the key cylinder releasing the latch member for permitting it to slide in the direction of the steering column and thereby releasing said hanger and bolt for movement into locking engagement with the steering column.

References Cited

UNITED STATES PATENTS

| | | | |
|---|---|---|---|
| 1,126,262 | 1/1915 | Nichols | 200—42 |
| 2,036,370 | 4/1936 | Smith | 200—44 |
| 2,036,776 | 4/1936 | Rubner | 200—44 XR |

HERMAN O. JONES, Primary Examiner

M. GINSBURG, Assistant Examiner

U.S. Cl. X.R.

200—44